United States Patent
Hwang et al.

(10) Patent No.: US 7,812,899 B2
(45) Date of Patent: Oct. 12, 2010

(54) POLARIZED LIGHT EMITTING LIGHT GUIDE PLATE, METHOD OF MANUFACTURING THE SAME AND ILLUMINATOR FOR FLAT PANEL DISPLAY DEVICE USING POLARIZED LIGHT EMITTING LIGHT GUIDE PLATE, COMPRISING ANISOTROPIC LIQUID CRYSTAL POLYMER LAYER WITH LIGHT EXTRACTION MICROSTRUCTURE AND LIQUID CRYSTAL ALIGNMENT MICROSTRUCTURE

(75) Inventors: Seong-mo Hwang, Seongnam-si (KR); Dong-ho Wee, Gunpo-si (KR); Seung-ho Nam, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 11/510,658

(22) Filed: Aug. 28, 2006

(65) Prior Publication Data

US 2007/0183038 A1 Aug. 9, 2007

(30) Foreign Application Priority Data

Feb. 8, 2006 (KR) .................... 10-2006-0012032

(51) Int. Cl.
*G02F 1/1335* (2006.01)
*G02F 1/1337* (2006.01)
*F21V 7/04* (2006.01)

(52) U.S. Cl. ................. 349/62; 349/64; 349/65; 349/96; 349/124; 349/191; 362/617; 362/618; 362/619; 362/620

(58) Field of Classification Search ............ 349/96, 349/62, 64, 65, 124, 127, 135, 191
See application file for complete search history.

(56) References Cited

U.S. PATENT DOCUMENTS 5,587,816 A * 12/1996 Gunjima et al. ............... 349/62

(Continued)

FOREIGN PATENT DOCUMENTS

EP 9-326205 A 12/1997

(Continued)

OTHER PUBLICATIONS

Hugo J Cornelissen, et al.: "38.3: Polarized Light LCD Backlight based on Liquid Crystalline Polymer Film: A New Manufacturing Process", 2004 SID International Symposium. Seattle, WA, May 25-27, 2004, SID International Symposium, San Jose, CA : SID, US, May 25, 2004, pp. 1178-1181, XP007011931.

(Continued)

*Primary Examiner*—Andrew Schechter
*Assistant Examiner*—Paisley L Arendt
(74) *Attorney, Agent, or Firm*—Sughrue Mion, PLLC

(57) ABSTRACT

A polarized light emitting light guide plate includes: a transparent substrate of optically isotropic material, in which the light incident through a lateral side thereof travels; an anisotropic liquid crystal polymer layer formed on an upper surface of the substrate and having first and second refractive indices with respect to first and second perpendicular polarization components; and a polarization separation microstructure formed at an interface between the transparent substrate and the liquid crystal polymer layer, which refracts or reflects the first polarization component and transmits the second polarization component. The refractive index of the polarization separation microstructure is substantially equal to the refractive index of the substrate; the first refractive index of the liquid crystal polymer layer is greater than the refractive index of the substrate, and the second refractive index of the liquid crystal polymer layer light is substantially equal to the refractive index of the substrate.

10 Claims, 10 Drawing Sheets

U.S. PATENT DOCUMENTS

| | | | | |
|---|---|---|---|---|
| 5,600,455 | A | * | 2/1997 | Ishikawa et al. ............... 349/57 |
| 5,771,328 | A | * | 6/1998 | Wortman et al. ............ 385/146 |
| 6,104,454 | A | * | 8/2000 | Hiyama et al. ................ 349/65 |
| 6,952,252 | B2 | * | 10/2005 | Nakanishi ................... 349/182 |
| 2001/0019479 | A1 | * | 9/2001 | Nakabayashi et al. ......... 349/64 |
| 2002/0057399 | A1 | * | 5/2002 | Ishitaka ....................... 349/65 |
| 2002/0060764 | A1 | | 5/2002 | Taniguchi et al. |
| 2003/0058383 | A1 | * | 3/2003 | Jagt et al. ..................... 349/65 |
| 2003/0058386 | A1 | | 3/2003 | Bastiaansen et al. |

FOREIGN PATENT DOCUMENTS

| | | |
|---|---|---|
| EP | 0778484 B1 | 4/2002 |
| WO | 01/29148 A1 | 4/2001 |

OTHER PUBLICATIONS

Blom S.M.P., et al.: Towards a Polarized Light-Emitting Backlight: Micro-Structured Anisotropic Layers, Journal of the Society for Information Display, Society for Information Display, San Jose, CA, vol. 10, No. 3, 2002, pp. 209-213, XP009012351.

* cited by examiner

US 7,812,899 B2

POLARIZED LIGHT EMITTING LIGHT GUIDE PLATE, METHOD OF MANUFACTURING THE SAME AND ILLUMINATOR FOR FLAT PANEL DISPLAY DEVICE USING POLARIZED LIGHT EMITTING LIGHT GUIDE PLATE, COMPRISING ANISOTROPIC LIQUID CRYSTAL POLYMER LAYER WITH LIGHT EXTRACTION MICROSTRUCTURE AND LIQUID CRYSTAL ALIGNMENT MICROSTRUCTURE

CROSS-REFERENCE TO RELATED PATENT APPLICATION

This application claims the benefit of Korean Patent Application No. 10-2006-0012032, filed on Feb. 8, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to a polarized light emitting light guide plate, a method of manufacturing the same, and an illuminator for a flat panel display device using the polarized light emitting light guide plate, and more particularly, to a polarized light emitting plate which can emit light with a predetermined polarized component, a method of manufacturing the same, and an illuminator for a flat panel display device using the polarized light emitting light guide plate.

2. Description of the Related Art

Flat panel displays are classified into emissive displays, which form images by emitting light themselves, and non-emissive displays, which form images by receiving light from an external source. For example, a liquid crystal display is a non-emissive flat panel display device. A non-emissive flat panel display device such as a liquid crystal display requires an additional illumination system such as a backlight unit. However, conventional liquid crystal displays only use about 5% of the light emitted from a light source. Such low light use efficiency is mainly due to light absorption in polarization plates and color filters of the liquid crystal display. Specifically, since absorptive polarization plates, which are disposed on both sides of the liquid crystal display, absorb about 50% of unpolarized incident light, the absorptive polarization plates are the greatest cause of the low light use efficiency of the liquid crystal display.

In order to solve this problem, a backlight unit that emits light having the same polarization as a rear surface polarization plate or a polarizer attached on a rear surface of a liquid crystal display has been suggested. For example, an edge type backlight unit having a light source disposed at a lateral side of a light guide plate may include a multi-layered, reflective polarization film, such as a dual brightness enhancement film (DBEF), disposed onto an upper surface of the light guide plate to increase the light using efficiency of the liquid crystal display. However, this additional reflective polarization film is expensive, and the increase in the light use efficiency resulting from its usage is limited due to the lack of a polarization conversion member. Therefore, research is being conducted to create a polarized light emitting light guide plate that polarizes and converts light by itself.

FIG. 1 is a schematic view of a polarized light emitting light guide plate disclosed in U.S. Patent Publication No. 2003/0058386 A1. Referring to FIG. 1, the conventional polarized light emitting light guide plate 10 includes an anisotropic light separation layer 13 having an embossing surface 14 formed on an isotropic light guide plate 11. Also, an isotropic addition layer 15 having a flat surface is formed on the anisotropic light separation layer 13. The anisotropic light separation layer 13 is formed, for example, by uniaxially stretching a polymer sheet such as a poly ethylene terephthalate (PET) sheet or a poly ethylene naphthalate (PEN) sheet, thus having different refractive indices with respect to s-polarized light and p-polarized light, and hot embossing the same. In the polarized light emitting light guide plate 10 illustrated in FIG. 1, the refractive index of the anisotropic light separation layer 13 is higher with respect to s-polarized light than with respect to p-polarized light. Also, the refractive index of the isotropic light guide plate 11 is between the two refractive indices of the anisotropic light separation layer 13, and the refractive index of the isotropic addition layer 15 is equal to the refractive index of the anisotropic light separation layer 13 with respect to p-polarized light.

In the polarized light emitting light guide plate 10, light $b_s1+b_p1$ is incident on an upper surface of the light guide plate 11 at a smaller angle than a critical angle with respect to p-polarized light among light b traveling inside the light guide plate 11. The light $b_s1+b_p1$ is separated into an s-polarized component $b_s1$ and a p-polarized component $b_p1$ in the light separation layer 13. The s-polarized component $b_s1$ passes through the isotropic addition layer 15 and is emitted to the outside, and the p-polarized component $b_p1$ is totally reflected at an upper surface of the isotropic addition layer 15. Also, an s-polarized component $b_s2$ of light $b_s2+b_p2$ that is incident on the upper surface of the light guide plate 11 at a greater angle than the critical angle with respect to p-polarized light is not totally reflected but is output to the outside through the light separation layer 13 and the isotropic addition layer 15. A p-polarized component $b_p2$ is totally reflected at the upper surface of the light guide plate 11. Accordingly, the light emitted through the polarized light emitting light guide plate 10 is s-polarized.

However, when manufacturing the conventional polarized light emitting light guide plate 10, uniform uniaxial stretching of the anisotropic light separation layer 13, especially for larger size, is difficult. Also, in order to attach the light separation layer 13 to the upper surface of the light guide plate 11, a UV-curable adhesive coating layer 12 is needed, and the additional coating layer 15 needs to be formed using a UV-curable material. Thus, the manufacturing process of the conventional polarized light emitting light guide plate 10 is complicated.

FIG. 2 illustrates a method of manufacturing another conventional polarized light emitting light guide plate 20. Referring to FIG. 2, the conventional polarized light emitting light guide plate 20 is manufactured by attaching a liquid crystal polymer 23 to an isotropic light guide plate 21 in which a fine polarization separation pattern 22 is formed. However, since the liquid crystal polymer 23, which is cured on the transparent substrate 24, is used, a predetermined amount of light is lost due to the existence of the transparent substrate 24. Also, since a hot pressing process is conducted in order to attach the already cured liquid crystal polymer 23 to the light guide plate 21, the anisotropy of the liquid crystal polymer may be adversely affected due to high temperature and high pressure, and the polarization separation pattern 22 on the light guide plate 21 may be damaged.

SUMMARY OF THE INVENTION

Exemplary embodiments of the present invention provide a polarized light emitting light guide plate and a method of manufacturing the same that is simple. The present invention also provides an illuminator for a flat panel display device using the polarized light emitting light guide plate.

According to an exemplary aspect of the present invention, there is provided a polarized light emitting light guide plate comprising: a transparent substrate of an optically isotropic material, in which light incident through a lateral side of the polarized light emitting light guide plate travels; an anisotropic liquid crystal polymer layer formed on an upper surface of the substrate and having a first refractive index with respect to a first polarization component of light and a second refractive index, different from the first refractive index, with respect to a second polarization component perpendicular to the first polarization component; and a polarization separation microstructure formed at an interface between the transparent substrate and the liquid crystal polymer layer, which refracts or reflects the first polarization component, and transmits the second polarization component. The refractive index of the polarization separation microstructure is equal to the refractive index of the substrate. The first refractive index of the liquid crystal polymer layer is greater than the refractive index of the substrate, and the second refractive index of the liquid crystal polymer layer is equal to the refractive index of the substrate.

The liquid crystal polymer layer may be cured by coating photocurable liquid crystals on the upper surface of the substrate and radiating UV light onto the photocurable liquid crystals.

The polarization separation microstructure may be a micro prism array in which a plurality of micro prisms are arranged at predetermined intervals.

Also, a microstructure for the alignment of liquid crystal may be disposed on the upper surface of the substrate between the micro prisms to align the liquid crystals in the liquid crystal polymer layer in one direction.

According to the present invention, a transparent upper layer may be disposed on the upper surface of the liquid crystal polymer layer. The transparent upper layer comprises a liquid crystal alignment microstructure which aligns the liquid crystals in the liquid crystal layer in one direction.

The refractive index of the upper layer may be smaller than the first refractive index of the liquid crystal polymer layer.

According to another exemplary aspect of the present invention, an illuminator for a flat panel display device, the illuminator comprising: a polarized light emitting light guide plate as described above; a light source disposed at a first lateral side of the transparent substrate; a reflection mirror disposed at a second lateral side of the transparent substrate; and a polarization conversion member disposed between the transparent substrate and the reflection mirror and comprising an optically anisotropic material.

The polarization conversion member may be a one-quarter wavelength plate.

According to another exemplary aspect of the present invention, there is provided a method of manufacturing a polarized light emitting light guide plate comprising: providing an isotropic transparent substrate having a polarization separation microstructure on an upper surface thereof; coating photocurable anisotropic liquid crystals on the transparent substrate to a uniform thickness; aligning the photocurable anisotropic liquid crystals in one direction; and forming an anisotropic liquid crystal polymer layer. The anisotropic liquid crystal polymer layer has a first refractive index with respect to a first polarization component and a second refractive index, different from the first refractive index, with respect to a second polarization component, perpendicular to the first polarization component. The anisotropic liquid crystal polymer layer is formed by radiating UV light onto the photocurable anisotropic liquid crystals, thereby curing the liquid crystals. The refractive index of the polarization separation microstructure is equal to the refractive index of the substrate, and the first refractive index of the liquid crystal polymer layer is greater than the refractive index of the substrate, and the second refractive index of the liquid crystal polymer layer is equal to the refractive index of the substrate.

According to another exemplary aspect of the present invention, there is provided a polarized light emitting light guide plate comprising: a transparent substrate, comprising an optically isotropic material, in which light incident through a lateral side of the polarized light emitting light guide plate travels; a collimator disposed at a first side of the substrate which collimates light incident on the substrate to within a predetermined angle; an anisotropic liquid crystal polymer layer formed on an upper surface of the substrate and a light emission microstructure that is formed on the upper surface of the liquid crystal polymer layer. The anisotropic liquid crystal polymer layer has a first refractive index with respect to a first polarization component of light and a second refractive index, different from the first refractive index, with respect to a second polarization component of light, perpendicular to the first polarization component. The light emission microstructure emits light from the liquid crystal polymer layer to the outside. When the refractive index of the liquid crystal polymer layer with respect to the first polarized component of light is $n_e$, the refractive index of the liquid crystal polymer layer with respect to the second polarized component of light is $n_i$, and the refractive index of the substrate is $n_i$, $n_o < n_i \leq n_e$.

According to another exemplary aspect of the present invention, there is provided a method of manufacturing a polarized light emitting light guide plate comprising: providing an isotropic transparent substrate having a substantially flat upper surface; coating photocurable anisotropic liquid crystals on the transparent substrate to a uniform thickness; disposing a transparent isotropic upper layer on the anisotropic liquid crystals; and radiating UV light onto the anisotropic liquid crystals, thereby curing the liquid crystals and forming an anisotropic liquid crystal polymer layer. The transparent isotropic upper layer comprises a light emission microstructure and a liquid crystal alignment microstructure in a lower portion thereof. The anisotropic liquid crystal polymer layer has a first refractive index with respect to a first polarization component, and a second index of refraction, different from the first index of refraction, with respect to a second polarization component perpendicular to the first polarization component wherein when the first refractive index of the liquid crystal polymer layer is $n_e$, the second refractive index of the liquid crystal polymer layer is $n_o$, and the refractive index of the substrate is $n_i$, $n_o < n_i \leq n_e$.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
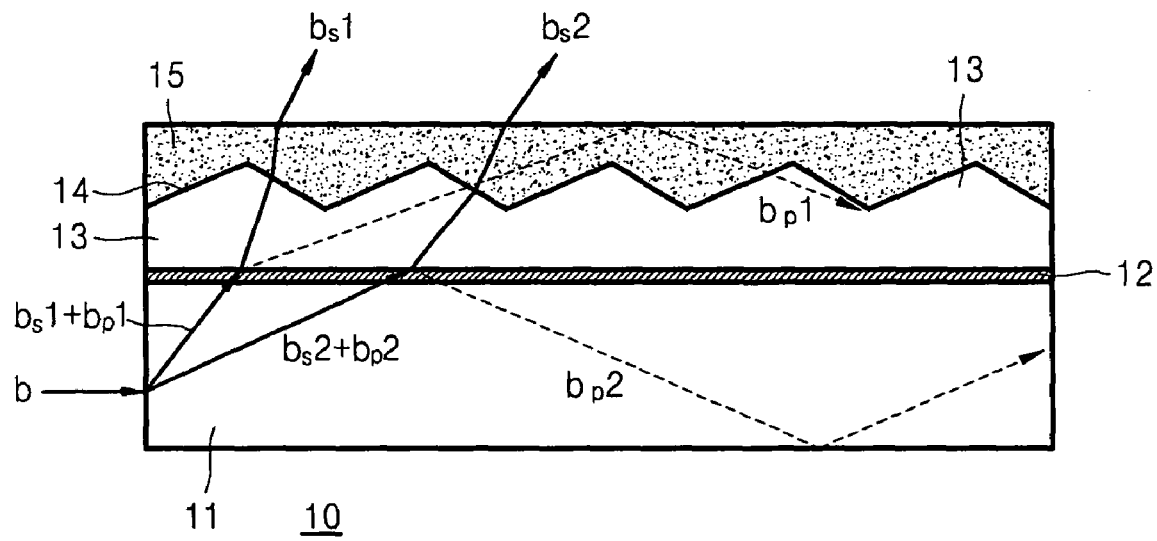
FIG. 1 is a schematic view of a conventional polarized light emitting light guide plate.
Figure 2:
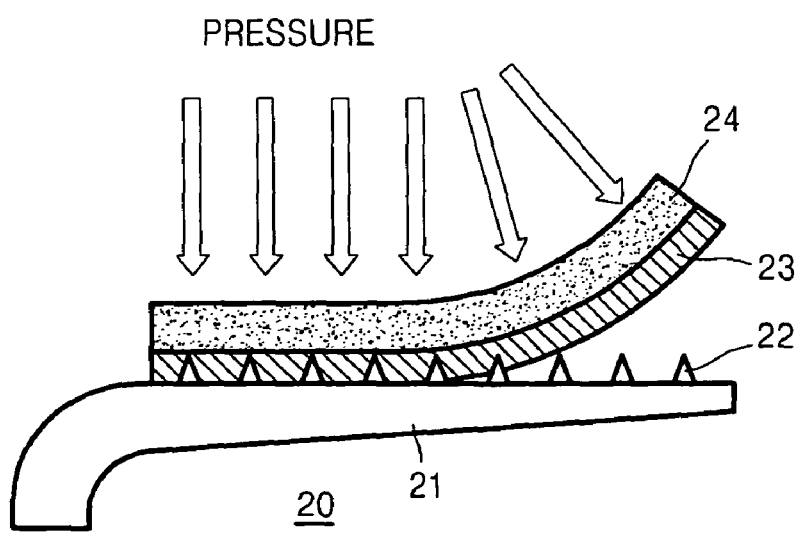
FIG. 2 is a schematic view illustrating a method of manufacturing another conventional polarized light emitting light guide plate.
Figure 3:
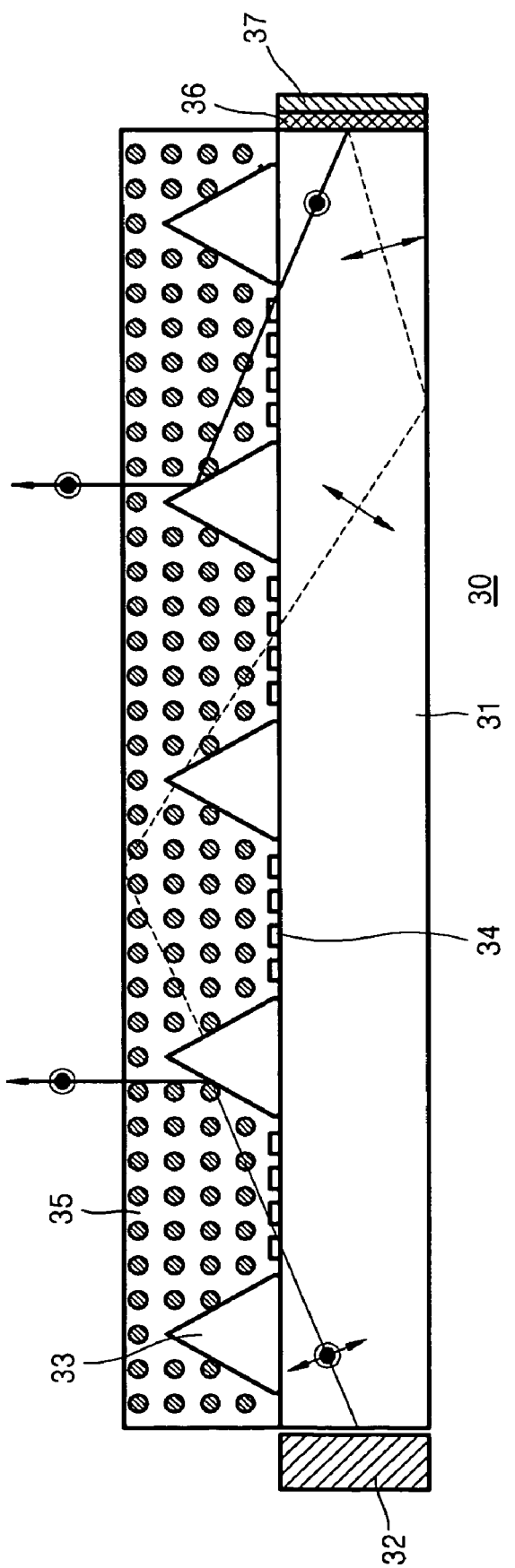
FIG. 3 illustrates an illuminator for a flat panel display device according to an exemplary embodiment of the present invention.

FIG. 3 illustrates an illuminator 30 for a flat panel display device according to an exemplary embodiment of the present invention. Referring to FIG. 3, the polarized light emitting light guide plate of the present embodiment includes a transparent substrate 31 in which incident light from a lateral side thereof travels, an anisotropic liquid crystal polymer layer 35 formed on an upper surface of the transparent substrate 31, and a polarization separation microstructure 33 that is formed at an interface between the transparent substrate 31 and the liquid crystal polymer layer 35.

According to an embodiment of the present invention, the transparent substrate 31 is formed of an optically isotropic material having a refractive index that is independent of polarization. For example, the transparent substrate 31 may be formed of poly methyl meth acrylate (PMMA) or poly carbonate (PC).

The liquid crystal polymer layer 35 is composed of an optically anisotropic material having different refractive indices with respect to two perpendicular polarizations of light. For example, the refractive index of the liquid crystal polymer layer 35 with respect to an ordinary ray may be substantially equal to the refractive index of the transparent substrate 31, and the refractive index with respect to an extraordinary ray may be greater than the refractive index of the transparent substrate 31. According to an embodiment of the present invention, the liquid crystal polymer layer 35 is formed by coating photocurable liquid crystals, referred to as reactive mesogen, on the transparent substrate 31, and curing the reactive mesogen.

The polarization separation microstructure 33 is formed on the upper surface of the transparent substrate 31 and is completely covered by the liquid crystal layer 35. According to an embodiment of the present invention, the polarization separation microstructure 33 may have a diffraction pattern or a microstructure for refracting, diffracting, or reflecting incident light. For example, as illustrated in FIG. 3, a micro prism array in which a plurality of micro trigonal prisms are arranged at predetermined intervals may be used as the polarization separation microstructure 33. Each of the trigonal prisms may have a width and height of about 1 to 10 μm. The polarization separation microstructure 33 refracts, diffracts, or reflects only a predetermined polarized component, and transmits the rest of the light, thereby separating the light into polarization components. To this end, the polarization separation microstructure 33 may be formed of an isotropic material having the same refractive index as the transparent substrate 31. Accordingly, the transparent substrate 31 and the polarization separation microstructure 33 may be formed as one piece by an injection molding process.

Also, as illustrated in FIG. 3, a liquid crystal alignment microstructure 34 may be formed on the upper surface of the transparent substrate 31 between the trigonal prisms. The liquid crystal alignment microstructure 34 aligns the liquid crystals in the liquid crystal polymer layer 35 in one direction. For example, the liquid crystal alignment microstructure 34 may be formed of stripes that are arranged side by side at regular intervals and have a width and height in the range of several hundreds of nm to 1 μm. In addition, the intervals between the stripes may be in the range of several hundreds of nm to 1 μm. Preferably, the liquid crystal alignment microstructure 34 is formed when the polarization separation microstructure 33 is formed.

A light source 32 is disposed at a first lateral side of the transparent substrate 31, a reflection mirror 37 is disposed at a second lateral side of the transparent substrate 31, and a polarization conversion member 36 is disposed between the transparent substrate 31 and the reflection mirror 37 in the illuminator 30 for a flat panel display device according to an exemplary embodiment of the present invention. The light source 32 may be a point light source such as a light emitting diode (LED) or a laser diode (LD), or a line light source such as a cold cathode fluorescent lamp (CCFL). The reflection mirror 37 reflects the light that is not emitted through the upper surface of the transparent substrate 31 but is emitted to the lateral side of the transparent substrate 31 into the transparent substrate 31. The polarization conversion member 36 converts the polarization of the light that reenters the transparent substrate 31 and is formed of an optically anisotropic material. For example, the polarization conversion member 36 may be a one-quarter wavelength plate.

Hereinafter, the operation of the polarized light emitting light guide plate and illuminator 30 for a flat panel display device will be described. First, light emitted from the light source 32 is incident on a lateral side of the transparent substrate 31 and travels to the interface between the transparent substrate 31 and the liquid crystal polymer layer 35. Here, the light is unpolarized light including all polarization components. As described above, the refractive index of the liquid crystal polymer layer 35 with respect to extraordinary rays is greater than the refractive index of the transparent substrate 31, and the refractive index of the liquid crystal polymer layer 35 with respect to ordinary rays is substantially equal to the refractive index of the transparent substrate 31. Accordingly, light is not totally reflected at the interface between the transparent substrate 31 and the liquid crystal polymer layer 35. At this time, light is incident on a surface of the polarization separation microstructure 33, which has a trigonal prism shape. Since the refractive index of the isotropic polarization separation microstructure 33 is lower than the refractive index of the liquid crystal polymer layer 35 with respect to extraordinary rays, as illustrated in FIG. 3, the extraordinary rays are refracted, diffracted or totally reflected by the polarization separation microstructure 33 and emitted to the outside through the upper surface of the liquid crystal polymer layer 35. On the other hand, the refractive index of the liquid crystal polymer layer 35 with respect to ordinary rays and the refractive index of the polarization separation microstructure 33 are equal, and the ordinary rays are transmitted directly through the polarization separation microstructure 33 without an alteration of their paths. Accordingly, the extraordinary rays and the ordinary rays are separated by the polarization separation microstructure 33.

Next, the ordinary rays are totally reflected at an interface between the upper surface of the liquid crystal polymer layer 35 and air and travel toward the transparent substrate 31. Then, the ordinary rays are totally reflected again at the interface between the lower surface of the transparent substrate 31 and air and emitted through the side of the transparent substrate 31. As illustrated in FIG. 3, the polarization conversion member 36 and the reflection mirror 37 are disposed at the second lateral side of the transparent substrate 31. Accordingly, the light is transmitted through the polarization conversion member 36, reflected by the reflection mirror 37, and transmitted through the polarization conversion member 36 again back into the transparent substrate 31. At this time, some of the ordinary rays are converted into extraordinary rays. Particularly when the polarization conversion member 36 is a one-quarter wavelength plate, most of the ordinary rays are converted into extraordinary rays. The light converted into extraordinary rays is refracted, diffracted, or totally reflected by the polarization separation microstructure 33 covered by the liquid crystal polymer layer 35 and emitted to the outside through the upper surface of the liquid crystal polymer layer 35. The rest of the ordinary rays which are not converted into extraordinary rays are totally reflected at the lower surface of the transparent substrate 31 and the upper surface of the liquid crystal polymer layer 35 and reciprocate between the sides of the transparent substrate 31 until being converted into extraordinary rays and emitted to the outside through the liquid crystal polymer layer 35.

As a result, in the polarized light emitting light guide plate and illuminator 30 according to the present embodiment, light emitted from the light source 32 is rarely lost, but is converted into light with a predetermined polarization and emitted to the outside. Accordingly, when the polarized light emitting light guide plate and illuminator 30 for the flat panel display device according to an exemplary embodiment of the present invention is used, for example, as a backlight unit for a liquid crystal display device, most of the emitted light is transmitted through a rear surface of the liquid crystal display device, thereby significantly increasing the light use efficiency.

Figure 4A:
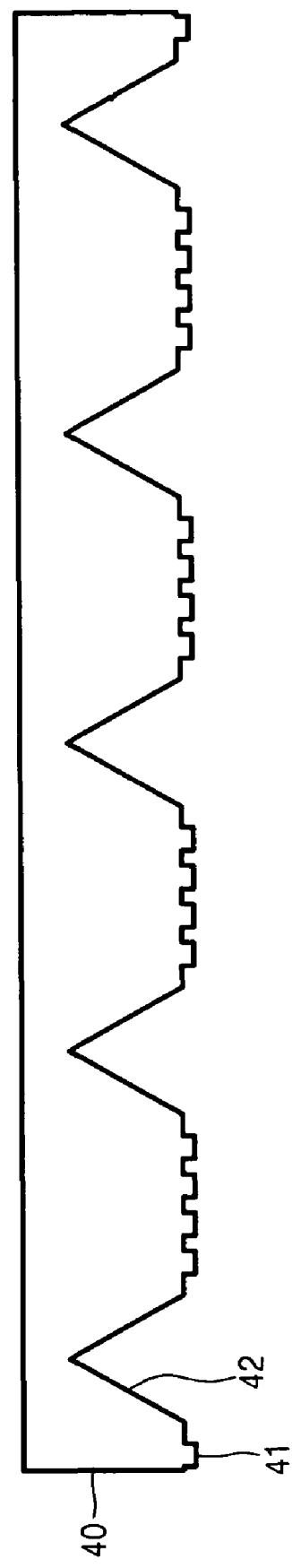
FIGS. 4A through 4C illustrate a method of manufacturing the polarized light emitting light guide plate of FIG. 3 according to an exemplary embodiment of the present invention.
Figure 4B:
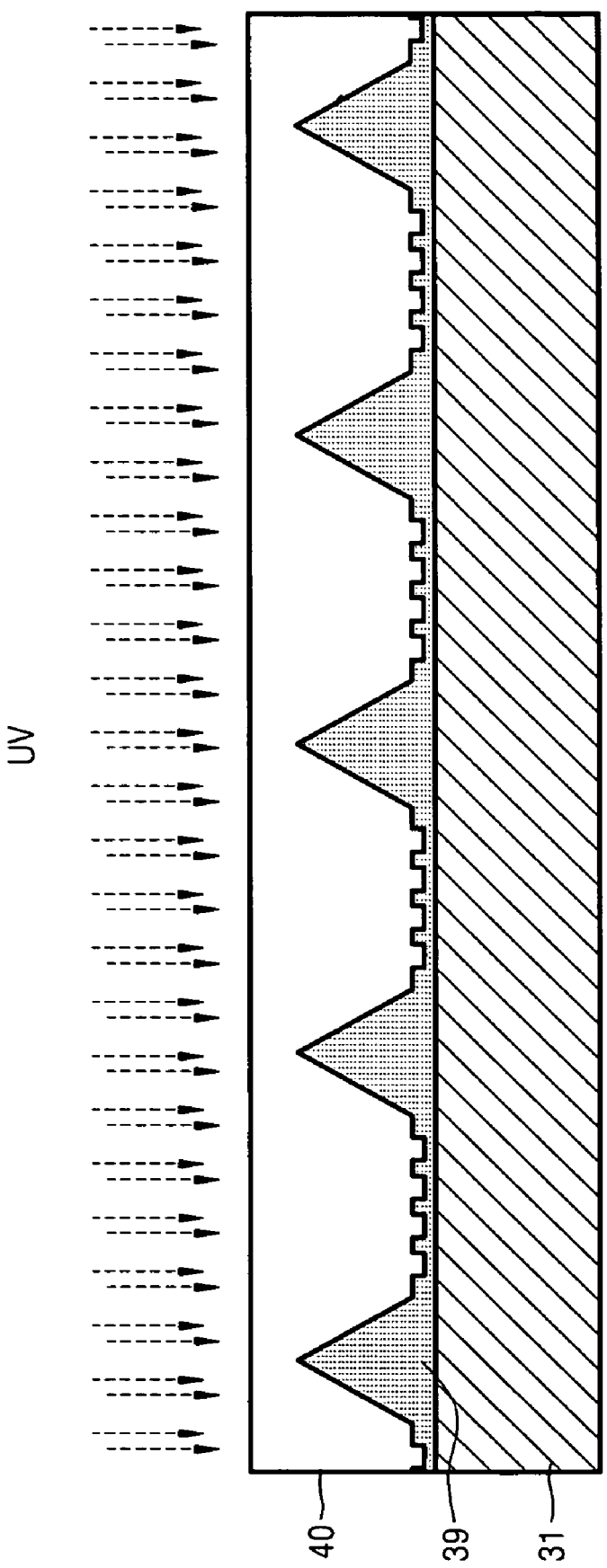
Figure 4C:
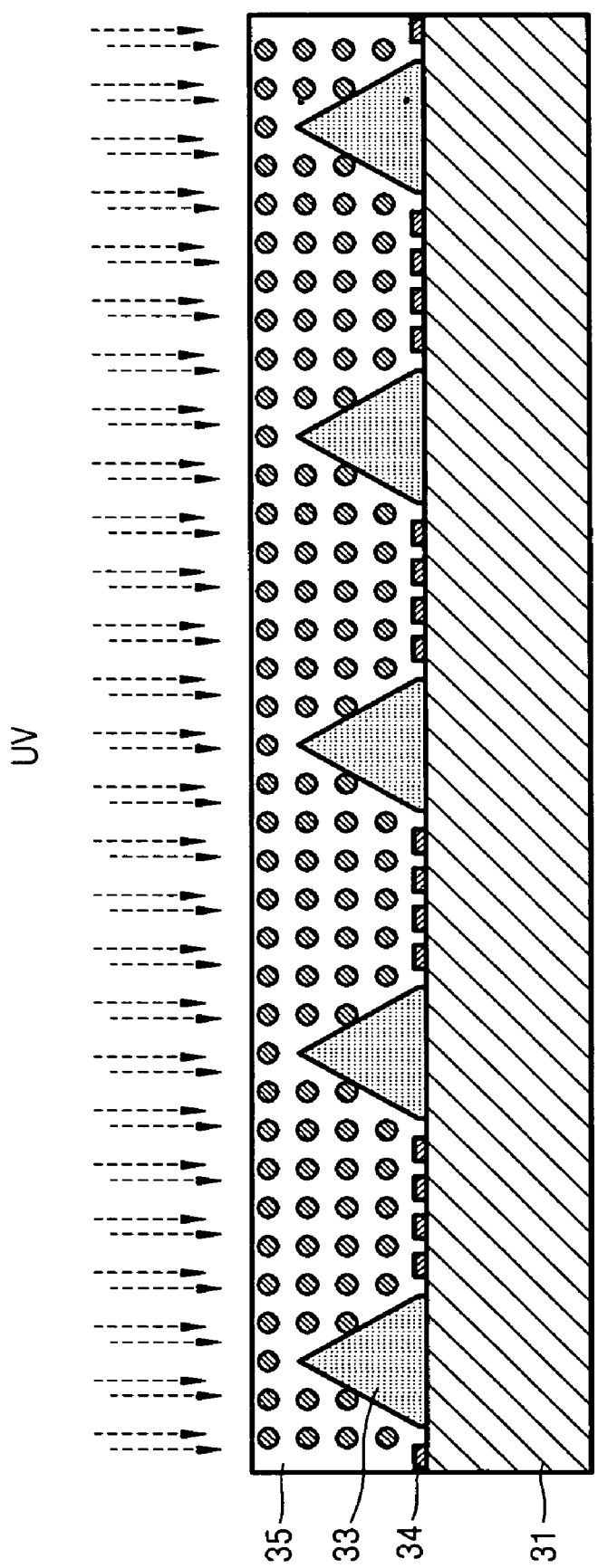

FIGS. 4A through 4C are cross-sectional views illustrating a method of manufacturing the above described polarized light emitting light guide plate. Hereinafter, a method of manufacturing the polarized light emitting light guide plate according to an exemplary embodiment of the present invention will be described with reference to FIGS. 4A through 4C.

First, referring to FIG. 4A, using a material such as polydimethylsiloxane (PDMS), a light transmissive stamp 40, on a lower surface of which an embossed liquid crystal alignment microstructure 41 and a carved polarization separation microstructure 42 are formed, is manufactured. Then, referring to FIG. 4B, a photocurable resin 39 is coated to a predetermined thickness on the upper surface of the flat transparent substrate 31, and the photocurable resin 39 is compressed with the stamp 40 of FIG. 4A. Thus a pattern corresponding to the pattern formed on the lower surface of the stamp 40 is formed on a surface of the photocurable resin 39. When UV light is radiated onto the photocurable resin 39 through the upper surface of the light transmissive stamp 40, the photocurable resin 39 is cured. When the photocurable resin 39 is completely cured, the stamp 40 is separated. Thus a polarization separation microstructure 33 and a liquid crystal alignment microstructure 34 are formed on the upper surface of the transparent substrate 31. However, a transparent substrate 31 including the polarization separation microstructure 33 and the liquid crystal alignment microstructure 34 can also be manufactured in a single piece by an injection molding process using a single material.

Then, referring to FIG. 4C, an anisotropic liquid crystal, that is, reactive mesogen, which is photocurable, is coated to a predetermined thickness on the upper surface of the polarization separation microstructure 33 and the liquid crystal alignment microstructure 34 using a method such as a spin coating method or the like. An example of the photocurable liquid crystals is Merck's RMS03-001. Here, the thickness to which the photocurable liquid crystal is coated should be sufficient to cover the polarization separation microstructure 33 completely. For example, the thickness of the photocurable liquid crystal may be about 10 μm. When the photocurable liquid crystal is coated, it is heated to a temperature of about 60° C., thereby removing solvents from the liquid crystal. In this process, the liquid crystal is aligned in the same direction as the liquid crystal alignment microstructure 34. Then, as illustrated in FIG. 4C, UV light is radiated onto the photocurable anisotropic liquid crystals to cure the liquid crystal. When the liquid crystal is cured, an anisotropic liquid crystal polymer layer 35 having different refractive indices with respect to two perpendicular polarized components is formed, thereby completing the polarized light emitting light guide plate. When Merck's RMS03-001 is used, the refractive index of the liquid crystal polymer layer 35 with respect to ordinary rays is about 1.53, and the refractive index of the liquid crystal polymer layer 35 with respect to extraordinary rays is about 1.68.

Figure 5:
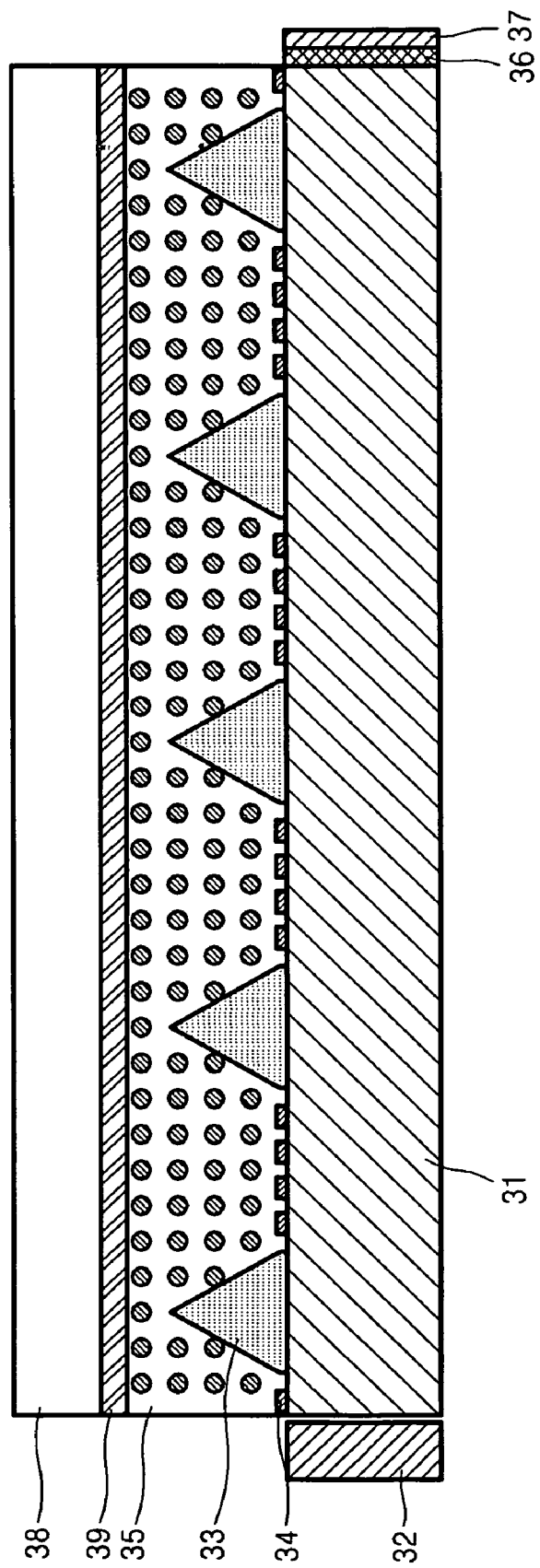
FIGS. 5 and 6 illustrate illuminators for a flat panel display device according to another exemplary embodiment of the present invention.

Meanwhile, when the photocurable anisotropic liquid crystal is coated to a thickness of greater than 10 μm, it may be difficult to align all the liquid crystals in one direction with the liquid crystal alignment microstructure 34 that is formed on the upper surface of the transparent substrate 31. In other words, liquid crystals that are close to the liquid crystal alignment microstructure 34 are aligned in the direction of the liquid crystal alignment microstructure 34, but liquid crystals that are far from the liquid crystal alignment microstructure 34 may be aligned in a different direction than the liquid crystal alignment microstructure 34. In this case, as illustrated in FIG. 5, a transparent upper layer 38, below which the liquid crystal alignment layer or microstructure 39 is formed, is disposed on the coated liquid crystals for the alignment improvement, and then the solvent in the liquid crystals is removed. Then, a cured liquid crystal polymer layer 35 is formed by radiating UV light through the transparent upper layer 38. After the liquid crystal polymer layer 35 is formed, the upper layer 38 can be removed. However, when the refractive index of the upper layer 38 is similar to the refractive index of the transparent substrate 31, as illustrated in FIG. 5, the upper layer 38 need not be removed, but may be left as a portion of the polarized light emitting light guide plate.

Figure 6:
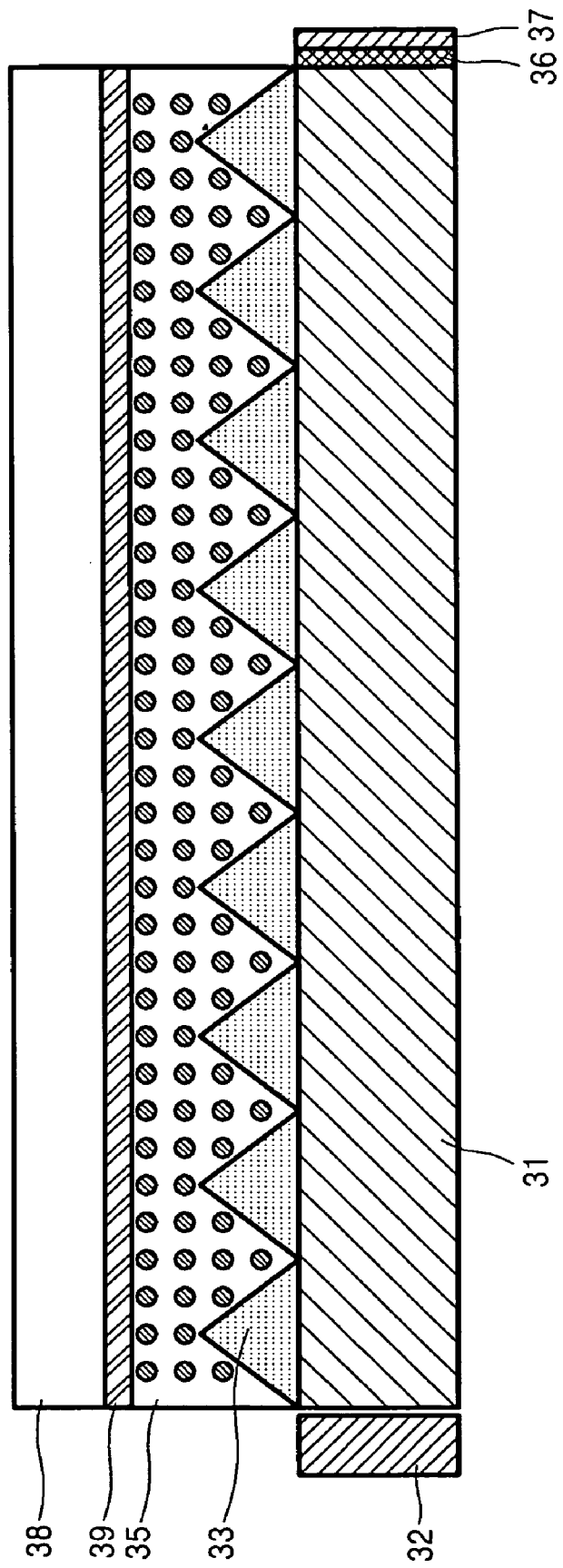

FIG. 6 illustrates an illuminator for a flat panel display device according to another embodiment of the present invention. In the present embodiment, only a polarization separation microstructure 33, for example, a trigonal prism array is formed on the upper surface of a transparent substrate 31, and a liquid crystal alignment microstructure is not formed on the transparent substrate 31. Instead, a transparent upper layer 38, below which the liquid crystal alignment layer or microstructure 39 is formed, is disposed on the coated liquid crystals to align the liquid crystals in one direction. As in the embodiment illustrated in FIG. 5, after a cured liquid crystal polymer layer 35 is formed, the transparent upper layer 38 may be removed or left as a portion of the polarized light emitting light guide plate.

Figure 7:
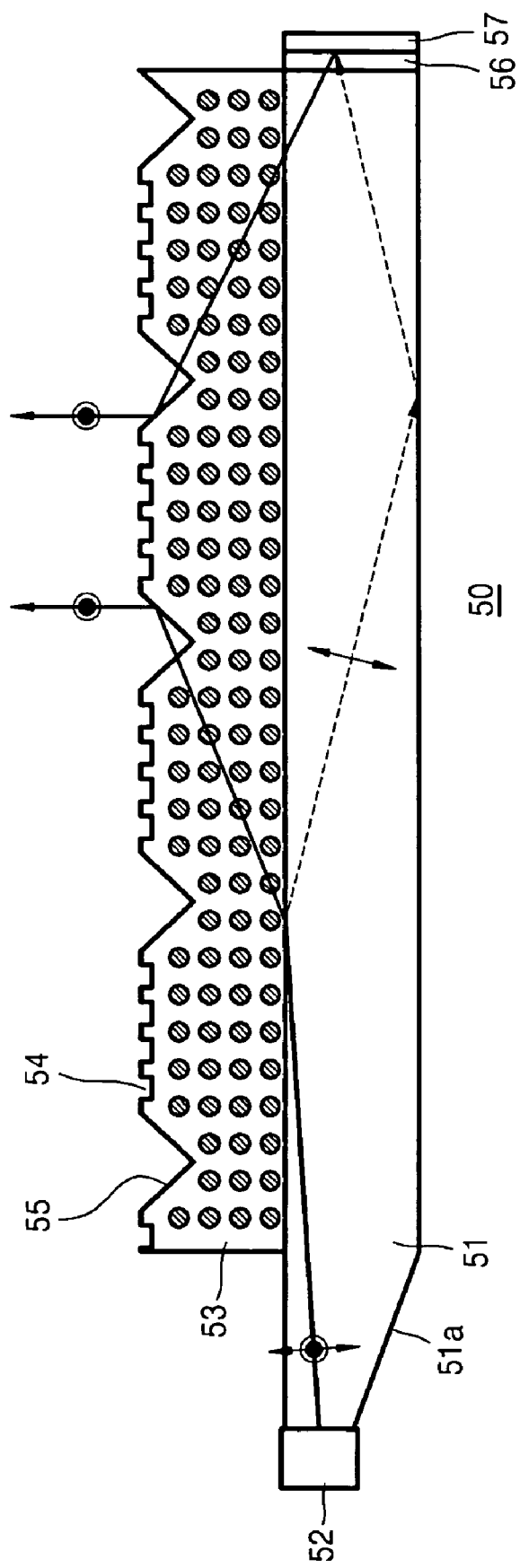
FIG. 7 illustrates an illuminator for a flat panel display device according to another exemplary embodiment of the present invention.

FIG. 7 illustrates a polarized light emitting light guide plate and illuminator 50 for a flat panel display device according to another embodiment of the present invention. Referring to FIG. 7, the polarized light emitting light guide plate according to the present embodiment includes a transparent substrate 51 in which incident light from a lateral side thereof travels, an anisotropic liquid crystal polymer layer 53 formed on the upper surface of the transparent substrate 51, and a light extraction microstructure 55 formed on the upper surface of the liquid crystal polymer layer 53. The transparent substrate 51 includes a collimator 51a at a side thereof.

As in the embodiment of FIG. 3, the transparent substrate 51 is formed of an optically isotopic material having a refractive index independent of the polarization of light. As in the embodiment illustrated in FIG. 3, the liquid crystal polymer layer 53 is formed of an optically anisotropic material having different refractive indices with respect to two perpendicular polarization components. The liquid crystal polymer layer 53 is formed by coating a photocurable liquid crystal on the transparent substrate 51 and curing the photocurable liquid crystal. However, the relationship between the refractive indices of the transparent substrate 51 and the liquid crystal polymer layer 53 is different from that discussed with respect to the embodiment illustrated in FIG. 3. In the present embodiment, when the refractive index of the liquid crystal polymer layer 53 with respect to extraordinary rays is $n_e$, the refractive index of the liquid crystal polymer layer 53 with respect to ordinary rays is $n_o$, and the refractive index of the transparent substrate 51 is $n_t$, where $n_o < n_t \leq n_e$.

The collimator 51a formed in a side of the transparent substrate 51 collimates the light incident on the transparent substrate 51 to be within a predetermined angle. Specifically, the collimator 51a collimates the light to an angle at which the ordinary rays of the light emitted from the light source 52 can be totally reflected at the interface between the transparent substrate 51 and the liquid crystal polymer layer 53. As illustrated in FIG. 7, the thickness of the collimator 51a may gradually decrease toward the light source 52. However, the shape of the collimator 51a is not limited to this. For example, one side of the transparent substrate 51 may be inclined, or a light refraction structure such as a trigonal prism may be formed on one side of the transparent substrate 51. Since various structures of the collimator 51a are well known in the art, a description thereof will be omitted.

The light extraction microstructure 55 formed on the upper surface of the liquid crystal polymer layer 53 is a microstructure for extracting light that is incident at a lower surface of the liquid crystal polymer layer 53. As illustrated in FIG. 7, the light extraction microstructure 55 may have a plurality of trigonal prisms that are engraved at regular intervals on the upper surface of the liquid crystal polymer layer 53. Also, an engraved liquid crystal alignment microstructure 54 may be formed on the upper surface of the liquid crystal polymer layer 53 between the trigonal prisms. The liquid crystal alignment microstructure 54 aligns the liquid crystals in the liquid crystal polymer layer 53 in one direction. For example, the liquid crystal alignment microstructure 54 may have a striped pattern in which stripes are arranged side by side.

A light source 52 is disposed at a first side of the transparent substrate 51 to radiate light toward the collimator 51a, a reflection mirror 57 is disposed at a second side of the transparent substrate 51, and a polarization conversion member 56 is disposed between the transparent substrate 51 and the reflection mirror 57. As in the previous embodiment, the light source 52 may be a point light source such as an LED or LD, or a line light source such as a CCFL. Also, the polarization conversion member 56 is formed of an optically anisotropic material, and may be a one-quarter wavelength plate.

The operation of the illuminator 50 for a flat panel display device of the present embodiment will now be described. First, light emitted from the light source 52 is incident on the collimator 51a of the transparent substrate 51. The light is collimated by the collimator 51a and travels to the interface between the transparent substrate 51 and the liquid crystal polymer layer 53. At this time, the light is unpolarized light including all polarized components. As described above, the refractive index of the liquid crystal polymer layer 53 with respect to ordinary rays is smaller than the refractive index of the transparent substrate 51, and the refractive index of the liquid crystal polymer layer 53 with respect to extraordinary rays is greater than or equal to the refractive index of the transparent substrate 51. Consequently, the ordinary rays collimated by a collimator 51a are totally reflected at the interface between the transparent substrate 51 and the liquid crystal polymer layer 53 and the extraordinary rays collimated by a collimator 51a are not totally reflected at the interface between the transparent substrate 51 and the liquid crystal polymer layer 53, but instead enter the liquid crystal polymer layer 53. Accordingly, as in the embodiment illustrated in FIG. 3, the extraordinary rays and the ordinary rays are separated at the interface between the transparent substrate 51 and the liquid crystal polymer layer 53.

The extraordinary rays incident on the liquid crystal polymer layer 53 are extracted to the outside through the upper surface of the liquid crystal polymer layer 53 via the light extraction microstructure 55 formed on the upper surface of the liquid crystal polymer layer 53. Meanwhile, the ordinary rays, which are totally reflected at the interface between the transparent substrate 51 and the liquid crystal polymer layer 53, travel to the lower surface of the transparent substrate 51 or to the other lateral side of the transparent substrate 51. The ordinary rays that travel to the lower surface of the transparent substrate are totally reflected at the interface between the lower surface of the transparent substrate 51 and air, and emitted to the other lateral side of the transparent substrate 51. As illustrated in FIG. 7, the polarization conversion member 56 and the reflection mirror 57 are disposed at the second lateral side of the transparent substrate 51. Accordingly, the light is transmitted through the polarization conversion member 56, reflected by the reflection mirror 57, and transmitted through the polarization conversion member 56 again into the transparent substrate 51. Thus, some of the ordinary rays are converted into extraordinary rays. Particularly, when the polarization conversion member 56 is a one-quarter wavelength plate, most of the ordinary rays are converted into extraordinary rays. The light converted into the extraordinary rays is incident on the liquid crystal polymer layer 53 and is extracted to the outside through the upper surface of the liquid crystal polymer layer 53 via the light extraction microstructure 55. As a result, the light emitted from the light source 52 is rarely lost, but is converted into light with a single polarization and extracted to the outside.

Figure 8:
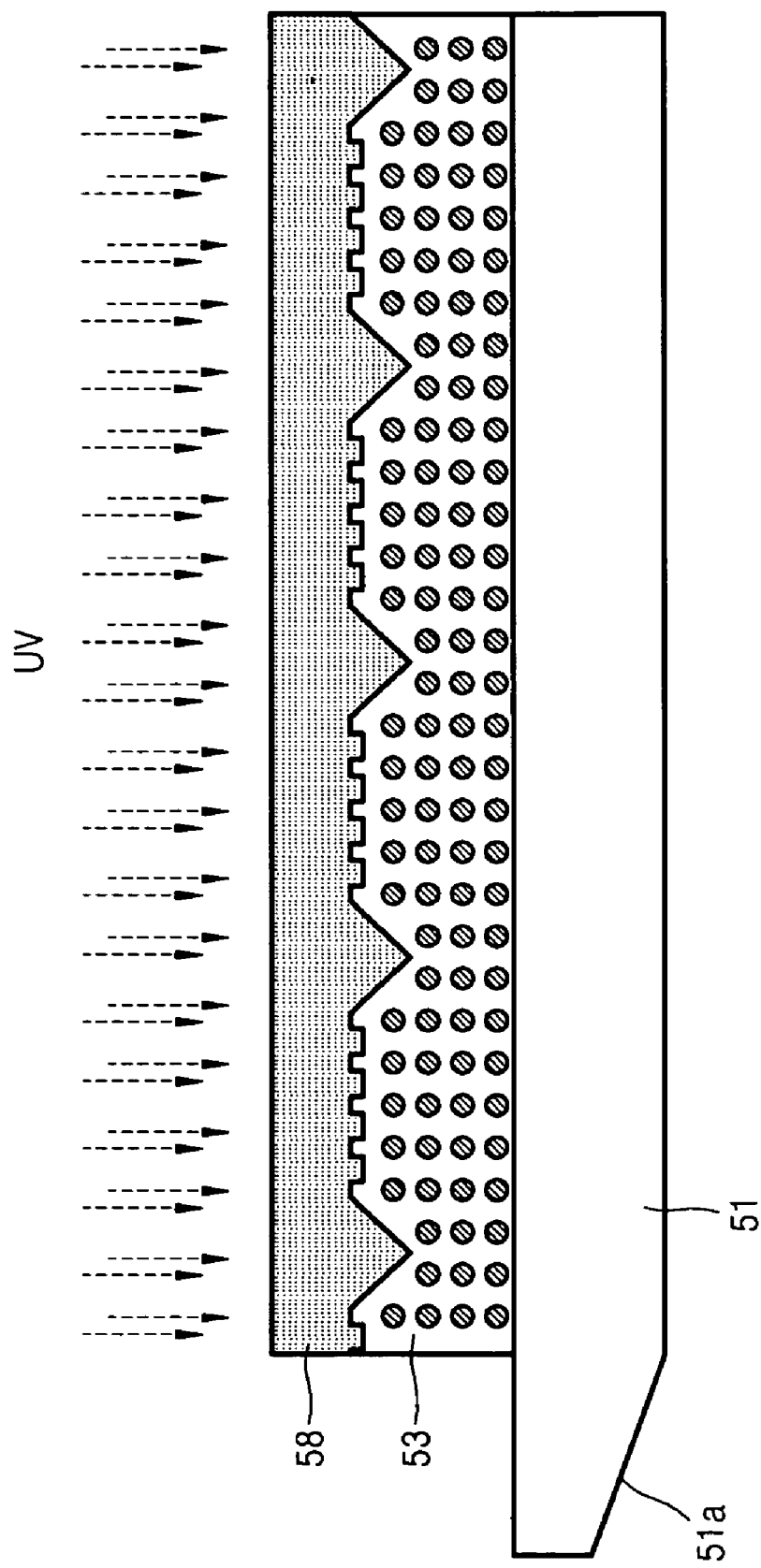
FIG. 8 is a schematic view illustrating a method of manufacturing the polarized light emitting light guide plate of FIG. 7 according to an exemplary embodiment of the present invention.

FIG. 8 is a schematic view illustrating a method of manufacturing the polarized light emitting light guide plate of FIG. 7. Hereinafter, the method of manufacturing the polarized light emitting light guide plate according to an exemplary embodiment of the present invention will be described.

First, photocurable anisotropic liquid crystals are coated to a uniform thickness on an isotropic transparent substrate 51 having a collimator 51a formed at one side thereof using a method such as spin coating. As in the previous embodiment, the photocurable liquid crystals may be reactive mesogen such as Merck's RMS03-001. The thickness of the photocurable liquid crystals may be about 1 to 10 μm. Then, a transparent isotropic upper layer 58, in the lower surface of which a light extraction microstructure and a liquid crystal alignment microstructure are embossed, is disposed on the anisotropic liquid crystals. The transparent isotropic upper layer 58 may be formed of, for example, PDMS. Then, the isotropic liquid crystals are pressed by the transparent isotropic upper layer 58 with a predetermined pressure so that a light extraction microstructure and a liquid crystal alignment microstructure can be formed in the upper surface of the photocurable liquid crystals.

Alternatively, the transparent isotropic upper layer 58, in which the light extraction microstructure and the liquid crystal alignment microstructure are embossed, is disposed above the upper surface of the transparent substrate 51, and then the space between the transparent substrate 51 and the transparent isotropic upper layer 58 is filled with photocurable anisotropic liquid crystals. In this case, a spacer (not shown) having a predetermined thickness (e.g., 10 μm) is disposed in a gap between the transparent substrate 51 and the transparent isotropic upper layer 58. The spacer controls the thickness of the anisotropic liquid crystals to be formed on the transparent substrate 51 and simultaneously facilitates the filling of the anisotropic liquid crystals between the transparent substrate 51 and the transparent isotropic upper layer 58.

Next, the liquid crystals are heated to a temperature of about 60° C. to remove any solvent remaining in the photocurable liquid crystals. In this process, the photocurable liquid crystals are aligned in the direction in which the liquid crystal alignment microstructure is formed in the bottom surface of the transparent isotropic upper layer 58. Next, as illustrated in FIG. 8, UV light is radiated onto the photocurable liquid crystals through the transparent isotropic upper layer 58 to cure the photocurable liquid crystals. When the liquid crystals are cured, an anisotropic liquid crystal polymer layer 53 having different refractive indices with respect to two perpendicular polarizations of light is formed on the transparent substrate 51, thereby completing the polarized light emitting light guide plate. When the polarized light emitting light guide plate is completed, the transparent isotropic upper layer 58 on the liquid crystal polymer layer 53 can be removed. However, if the refractive index of the transparent isotropic upper layer 58 is similar to the refractive index of the transparent substrate 51, the transparent isotropic upper layer 58 need not be removed, and is instead left as a portion of the polarized light emitting light guide plate.

Figure 9:
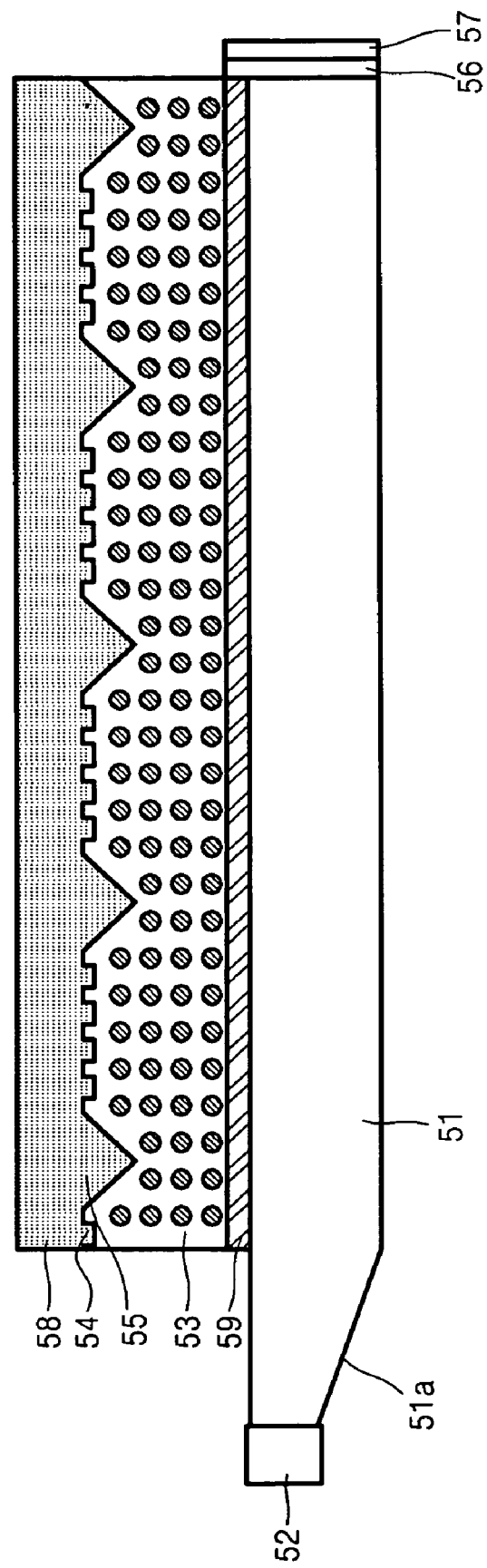
FIG. 9 illustrates an illuminator for a flat panel display device according to another exemplary embodiment of the present invention.

FIG. 9 illustrates an illuminator for a flat panel display device according to another exemplary embodiment of the present invention. As described above, when photocurable anisotropic liquid crystals are coated to a thickness of greater than 10 μm, it may be difficult to align all of the liquid crystals in one direction using a liquid crystal alignment microstructure which is formed on only one surface of the photocurable anisotropic liquid crystals. In other words, it may be difficult to align all of the liquid crystals in one direction using the liquid crystal alignment microstructure 54 formed on a lower surface of the transparent isotropic upper layer 58 in the embodiment illustrated in FIGS. 7 and 8. In the embodiment illustrated in FIG. 9, the photocurable anisotropic liquid crystals can be aligned in one direction when a liquid crystal alignment microstructure 59 is additionally formed on the upper surface of the transparent substrate 51 and the photocurable anisotropic liquid crystals are coated on the transparent substrate 51. As in the embodiment illustrated in FIG. 8, the transparent isotropic upper layer 58 remaining on the cured liquid crystal polymer layer 53 may be removed or may be left as a portion of the polarized light emitting light guide plate.

As described above, in a polarized light emitting light guide plate according to the present invention, only a small amount of the light emitted from a light source is lost, and most of the light is converted into light with a single polarization and emitted to the outside. Accordingly, when an illuminator for a liquid crystal display device is manufactured using a polarized light emitting light guide plate according to the present invention, most of the emitted light is transmitted through the rear polarization plate of the liquid crystal display device, thereby significantly increasing the light use efficiency.

Also, since the polarized light emitting light guide plate according to the present invention is manufactured by coating photocurable anisotropic liquid crystals on a transparent substrate and curing the photocurable anisotropic liquid crystals, the polarized light emitting light guide plate can be manufactured more uniformly than conventional polarized light guide plates, and the manufacturing process thereof is simple. Also, liquid crystals are not deformed since there is no high temperature or high pressure effects due to a hot pressing process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polarized light emitting light guide plate comprising:
a transparent substrate comprising an optically isotropic material, in which light incident through a lateral side of the polarized light emitting light guide plate travels;
a collimator disposed at a first side of the substrate which collimates light incident on the substrate to within a predetermined angle;
an anisotropic liquid crystal polymer layer formed on an upper surface of the substrate and having a first refractive index with respect to a first polarization component of light and a second refractive index, different from the first refractive index, with respect to a second polarization component of light, perpendicular to the first polarization component;
a light extraction microstructure, formed on an upper surface of the liquid crystal polymer layer, through which light is extracted from the liquid crystal polymer layer to outside of the liquid crystal polymer layer; and
a liquid crystal alignment microstructure which orients liquid crystals in the liquid crystal polymer layer in one direction,
wherein, when the first refractive index of the liquid crystal polymer is $n_e$, the second refractive index of the liquid crystal polymer layer is $n_o$, and a refractive index of the substrate is $n_i$, $n_o < n_i \leq n_e$,
wherein the light extraction microstructure has a plurality of trigonal micro prisms that are engraved at predetermined intervals on the upper surface of the liquid crystal polymer layer,
wherein the liquid crystal alignment microstructure is engraved in a form of stripes that are arranged side by side at predetermined intervals between the trigonal micro prisms, and
wherein the liquid crystal alignment microstructure and the light extraction microstructure are formed on the same upper surface of the liquid crystal polymer layer.

2. The polarized light emitting light guide plate of claim 1, wherein the liquid crystal polymer layer is formed by coating photocurable liquid crystals on the upper surface of the substrate and radiating UV light onto the photocurable liquid crystals, thereby curing the photocurable crystals.

3. The polarized light emitting light guide plate of claim 1, further comprising a transparent isotropic upper layer disposed on an upper surface of the liquid crystal polymer layer,
wherein the transparent isotropic upper layer comprises the light extraction microstructure and a liquid crystal alignment microstructure, which aligns the liquid crystals in the liquid crystal polymer layer in one direction.

4. The polarized light emitting light guide plate of claim 1, further comprising a liquid crystal alignment layer or microstructure disposed at an interface between the liquid crystal polymer layer and the substrate, which aligns the liquid crystals in the liquid crystal polymer layer in one direction.

5. An illuminator for a flat panel display device comprising:
the polarized light emitting light guide plate of claim 1;
a light source which radiates light toward the collimator;
a reflection mirror disposed at a side of the transparent substrate; and
a polarization conversion member comprising an optically anisotropic material, disposed between the transparent substrate and the reflection mirror.

6. The illuminator for a flat panel display device of claim 5, wherein the polarization conversion member is a one-quarter wavelength plate.

7. The illuminator for a flat panel display device of claim 5, wherein a thickness of the collimator gradually decreases from a side of the collimator facing the substrate to an opposite side of the collimator facing the light source.

8. A method of manufacturing a polarized light emitting light guide plate comprising:
providing an isotropic transparent substrate having a substantially flat upper surface and a collimator;
coating photocurable anisotropic liquid crystals on the transparent substrate to a uniform thickness;
disposing a transparent isotropic upper layer on the anisotropic liquid crystals, wherein the transparent isotropic upper layer comprises a light extraction microstructure and a liquid crystal alignment microstructure in a lower portion thereof; and
radiating UV light onto the anisotropic liquid crystals, thereby curing the anisotropic liquid crystals and forming an anisotropic liquid crystal polymer layer having a first refractive index with respect to a first polarization component and a second refractive index, different from the first refractive index, with respect to a second polarization component perpendicular to the first polarization component, and thereby forming a plurality of trigonal micro prisms which are engraved at predetermined intervals on an upper surface of the anisotropic liquid crystal polymer layer as the light extraction microstructure and forming a plurality of stripes which are engraved on the upper surface of the anistropic liquid crystal polymer layer as the liquid crystal alignment microstructure, the plurality of stripes being arranged side by side at predetermined intervals between the trigonal micro prisms,
wherein, when the first refractive index of the liquid crystal polymer layer is $n_e$, the second refractive index of the liquid crystal polymer layer is $n_o$, and a refractive index of the substrate is $n_i$, $n_o < n_i \leq n_e$, and
wherein the liquid crystal alignment microstructure and the light extraction microstructure are formed on the same upper surface of the liquid crystal polymer layer.

9. The method of claim 8, further comprising removing the transparent isotropic upper layer after the anisotropic liquid crystal polymer layer is formed.

10. The method of claim 8, further comprising forming a liquid crystal alignment layer or microstructure on the upper surface of the transparent substrate before coating the anisotropic liquid crystals.

* * * * *